United States Patent
Inada et al.

[11] Patent Number: 5,246,051
[45] Date of Patent: Sep. 21, 1993

[54] PNEUMATIC RADIAL TIRES INCLUDING BELT CORDS WITH FILAMENT RESIN COMPOSITE BODIES

[75] Inventors: Norio Inada; Shizuo Iwasaki, both of Kodaira; Michitsugu Kikuchi, Mitaka, all of Japan

[73] Assignee: Bridgestone Corporation, Tokyo, Japan

[21] Appl. No.: 755,230

[22] Filed: Sep. 5, 1991

[30] Foreign Application Priority Data

Sep. 11, 1990 [JP] Japan .................................. 2-238873

[51] Int. Cl.⁵ ........................... B60C 9/18; B60C 9/26
[52] U.S. Cl. ...................................... 152/527; 57/241; 57/258; 57/902; 152/528; 152/529; 152/536
[58] Field of Search ............... 152/451, 526, 527, 528, 152/529, 536; 428/295; 57/902, 241, 80, 258

[56] References Cited

U.S. PATENT DOCUMENTS

| | | | |
|---|---|---|---|
| 4,883,712 | 11/1989 | Ogawa et al. | 57/902 X |
| 4,889,174 | 12/1989 | Oshima et al. | 152/529 |
| 4,934,427 | 6/1990 | Oshima et al. | 152/451 |

FOREIGN PATENT DOCUMENTS

| | | | |
|---|---|---|---|
| 0312038 | 4/1989 | European Pat. Off. | |
| 0420333 | 4/1991 | European Pat. Off. | 152/451 |
| 60-85001 | 5/1985 | Japan | 152/451 |
| 63-134310 | 6/1988 | Japan | 152/451 |
| 63-151505 | 6/1988 | Japan | 152/527 |

OTHER PUBLICATIONS

European Search Report.
Patent Abstracts of Japan, vol. 12, No. 381 (M-752), Oct. 12, 1988, p. 137 M 752.
Patent Abstracts of Japan, vol. 12, No. 416 (M-759), Nov. 4, 1988, p. 11 M 759.

*Primary Examiner*—Michael W. Ball
*Assistant Examiner*—Adrienne C. Johnstone
*Attorney, Agent, or Firm*—Sughrue, Mion, Zinn, Macpeak & Seas

[57] ABSTRACT

A pneumatic radial tire comprises a belt comprised of plural belt layers, in which at least one belt layer is formed by arranging particular twisted cords, which are obtained by twisting particular filament-resin composite bodies, at a particular end count. In this tire, the weight is light, the rolling resistance and steering stability as well as the resistances to bending of belt cord in the rapid turning and breaking of belt cord in the running on bad road are considerably excellent.

11 Claims, 5 Drawing Sheets

FIG_1
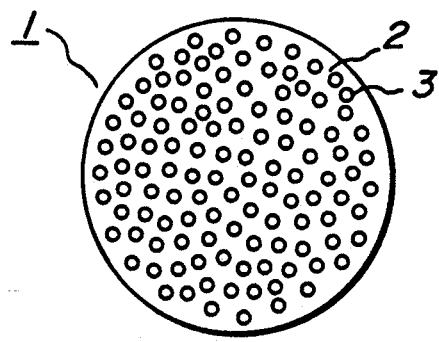
FIG_2a
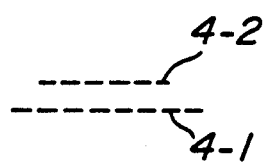
FIG_2b
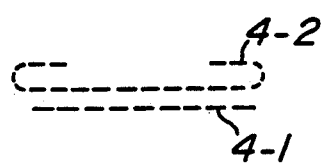
FIG_2c
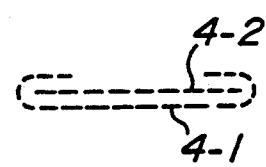
FIG_2d
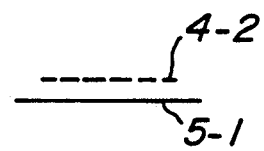
FIG_2e
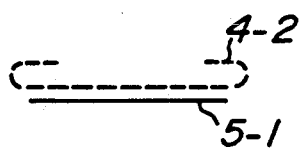
FIG_2f
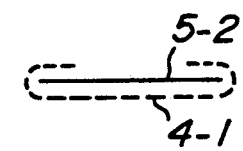
FIG_2g
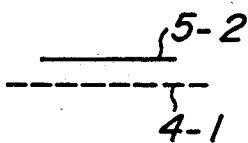
FIG_2h
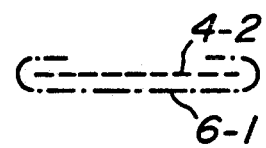
FIG_2i
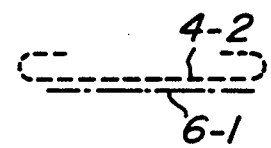
FIG_2j
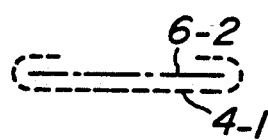
FIG_2k
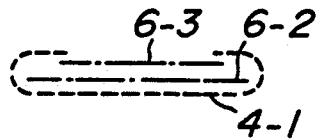

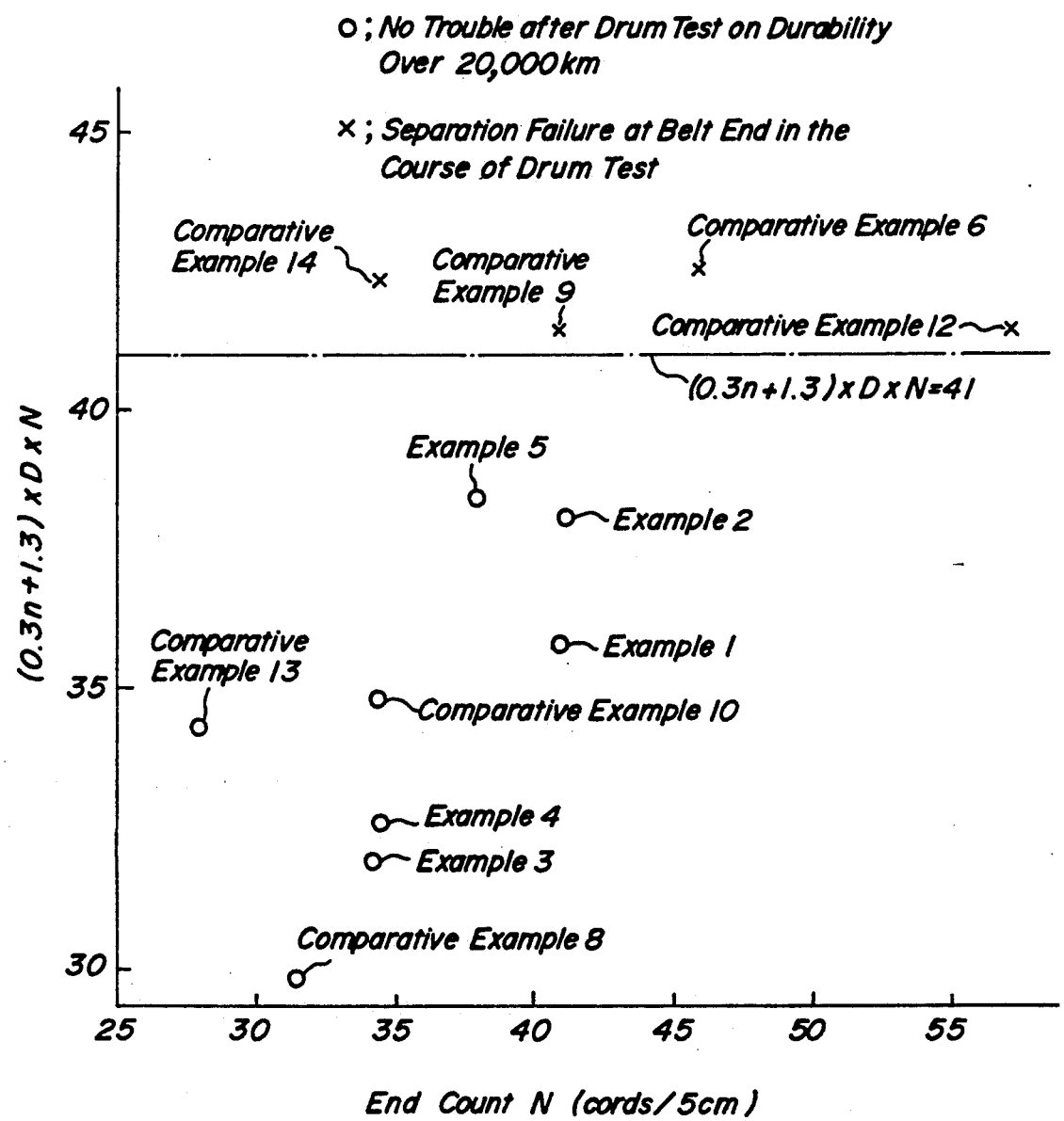

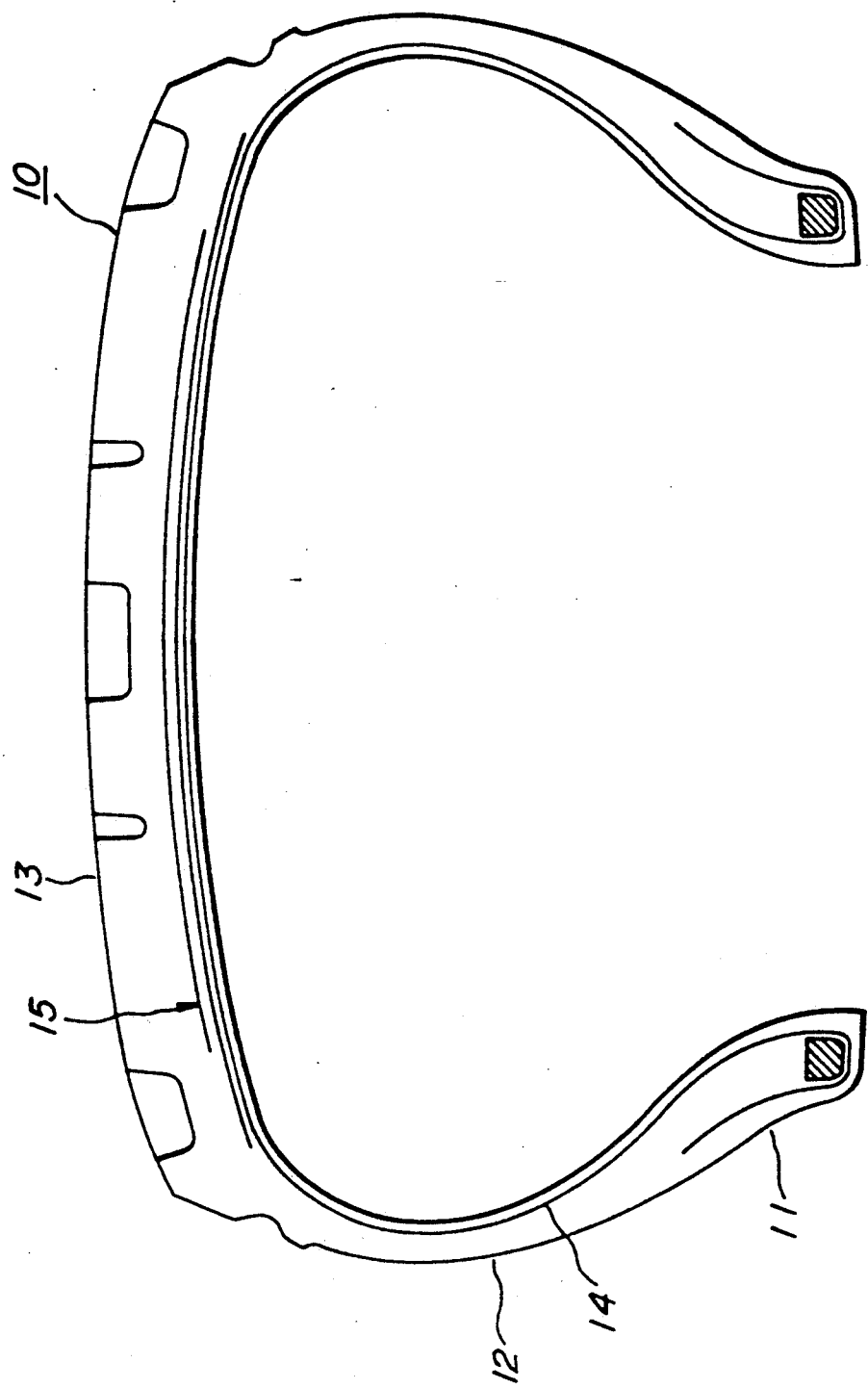

PNEUMATIC RADIAL TIRES INCLUDING BELT CORDS WITH FILAMENT RESIN COMPOSITE BODIES

BACKGROUND OF THE INVENTION

1. Field of the Invention

This invention relates to pneumatic radial tires, and more particularly to a pneumatic radial tire having a light weight, small rolling resistance and excellent steering stability and durability of belt cords and the like. It is accomplished by using in at least one belt reinforcing layer cords obtained by twisting filament-resin composite bodies.

2. Disclosure of the Related Art

In radial tires having a steel belt, the steering stability, wear resistance and the like are very excellent because the belt rigidity is fairly high as compared with the case of using organic fiber cords such as rayon, polyester or the like in the belt. On the other hand, these tires have several problems in that the amount of steel used is large which degrades the rolling resistance, the weight of the belt is large and the centrifugal force during the running becomes large to cause standing wave and degrade the high-speed durability. Also, and rust is created by the penetration of water and the like from exterior to cause tire breakage.

In order to solve these problems, however, when so-called multifilament twisted fiber cords such as aramide fiber or carbon fiber having a high tensile modulus are used as a belt material, the steering stability and wear resistance are improved as compared with the case of using rayon or polyester fiber cords. But, this cannot be said that they are sufficient as compared with the case of using steel cords. Since the multifilament twisted fiber cord is a set of very fine filaments (diameter: about 5–35 μm) and is very flexible, it has a modulus of elasticity fairly sufficient to tensile strain, but shows very low compressive modulus and bending modulus against compression strain and bending strain. Therefore, the bending rigidity of the belt in the ground contacting area during the turning is insufficient, so that a sufficient cornering force is not caused and the steering stability is poor.

On the other hand, Japanese Patent laid open No. 63-134310 and No. 63-151505 have proposed the use of fiber reinforced material obtained by impregnating a bundle of high-strength and high-modulus fibrous filaments with thermosetting resin or thermoplastic resin as a belt material having a light weight, an excellent rolling resistance and a sufficient steering stability. When such a fiber reinforced material is used as a belt material of a tire without twisting the filaments, it has a certain compression modulus, so that the steering stability is surely improved. However, this material has been confirmed to have a serious drawback on the durability that cords in the belt buckle at the bending compression side due to the buckling of the ground contacting rear region produced in the rapid turning of the tire and finally arrive at the occurrence of cord breakage after the repetitive bending. Such cord breakage is caused in the groove bottom of the ground contacting portion of the tread. Particularly, significant cord breakage are occurs even under a relatively mild condition the cord breakage is not caused in the steel cords usually used in the radial tire.

Furthermore, it has been confirmed that when the above filament-resin composite body is used as a twisted cord in the belt of the radial tire, if the cord strength, elongation at break and end count are unsuitable, local breakage of several cords in the belt is caused inside the tire in the riding over stones scattered on road surface or protrusions on the road, which becomes a safety problem. In order to prevent the occurrence of such breakage, however, the end count of the cords in the belt is increased to enhance the belt strength, but it is apt to create separation failure at the belt end.

SUMMARY OF THE INVENTION

It is, therefore, an object of the invention to provide pneumatic radial tires having a light weight, small rolling resistance and excellent steering stability and durability to belt cord breakage by using filament-resin composite body in the belt.

Particularly, the invention provides a solution on the problem of belt cord breakage produced in the rapid turning when the above filament-resin composite body obtained by impregnating a bundle of high-strength and high-modulus filaments with a given resin is applied to the belt of the radial tire without twisting. This invention provides a technique that the durability against belt breakage in the rapid turning is largely improved while maintaining high steering stability and also the resistance to belt cord breakage on a bad road is improved.

The inventors have made various studies in order to solve the above problems and found that since the fiber reinforced material obtained by impregnating the given filament bundle with a thermosetting resin or thermoplastic resin as disclosed in the above Japanese Patent laid open No. 63-134310 and No. 63-151505 is fundamentally a set of many parallel filaments gathered with the resin without twisting, when such a fiber reinforced material is applied as a cord to the belt of the radial tire, local cord buckling is caused by compression strain produced in the belt cord layer during the rapid turning and the cord breakage is created at such a buckled portion by the repetition of the rapid turning.

Therefore, the inventors have made further studies and found that the above problems can be solved when a relation between strength SF of the filament-resin composite body and strength SY of filament before the impregnation with the resin and a relation among filament diameter, twisting pitch, twisting number, cord strength as a twisted cord, elongation at break and end count satisfy particular ranges, respectively, and as a result the invention has been accomplished.

According to the invention, there is the provision of a pneumatic radial tire comprising a pair of bead portions, a pair of side wall portions each extending from the respective bead portion a tread portion extending between the sidewall portions, a carcass extending between the bead portions and comprised of at least one carcass ply containing cords arranged at a cord angle of 75°–90° with respect to a circumferential direction of the tire, and a belt arranged on the carcass in the tread portion and comprised of plural belt layers each containing cords arranged at a cord angle of 10°–35° with respect to the circumferential direction of the tire, cords of which layers being crossed with each other, characterized in that at least one belt layer among the above belt layers is a rubberized layer of cords obtained by completely impregnating a substantially non-twisted bundle of filaments selected from aromatic polyamide filament, high-strength, and high modulus polyvinyl alcohol filament and carbon filament having a tensile strength ($T_Y$) of not less than 15 g/d and a tensile modulus ($M_Y$) of not less than 250 g/d with a resin to form a filament-resin composite body of substantially circular section having a diameter (D) of 0.2–0.55 mm and then twisting a plurality of the filament-resin composite bodies into a layer construction of 1×n (wherein n is an integer of 2–5) at a twisting pitch (l) of 5–30 mm, in which a breaking load ($S_F$) of the filament-resin composite body to a breaking load ($S_Y$) of the filament before the impregnation with the resin satisfies $S_F/S_Y \geq 1.0$, and an end count (N, cords/5 cm) of the rubberized layer located at its crown center portion satisfies a relation represented by the following formula:

$$8600/(S_C \times E_C) < N < 41/[(0.3n+1.3) \times D]$$

(wherein $S_C$ is a strength (kg) of the cord after the twisting, $E_C$ is an elongation at break (%) and n and D are the same as mentioned above).

BRIEF DESCRIPTION OF THE DRAWINGS

The invention will be described with reference to the accompanying drawings, wherein:

FIG. 1 is a sectional view of a filament-resin composite body used in a pneumatic radial tire according to the invention;

FIGS. 2a to 2k are schematic views showing various arrangements of a belt layer containing the filament-resin composite body in the pneumatic radial tire according to the invention, respectively;

FIG. 6 is a graph showing a relation between (0.3n+1.3)D×N and end count N on troubles by drum test for the durability or the pneumatic radial tire; and FIG. 7 is a schematic cut-away view of a tire.

DESCRIPTION OF THE PREFERRED EMBODIMENTS

Figure 3:
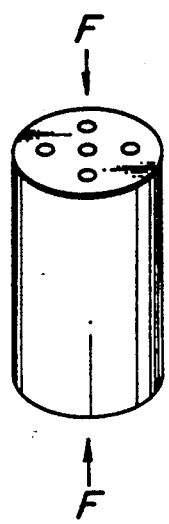
FIG. 3 is a perspective view of a cord sample for the measurement of compression modulus $CM_C$.

In the pneumatic radial tire according to the invention, the filament used as a cord material of the belt is selected from aromatic polyamide filament having high strength, high modulus of elasticity and light weight, high-strength and high-modulus polyvinyl alcohol filament and carbon filament. Among high-strength and high-modulus filaments, glass fiber is not favorable because the specific gravity is as heavy as 2.5. Also ceramic fiber and Tirano fiber (trade name of inorganic fiber, made by Ube Industries, Ltd.) are not suitable for the improvement of the resistance to belt cord bending aiming at the invention because they are weak to input from the lateral direction of the fiber.

As the aromatic polyamide filament used in the invention, mention may be made of poly (1,4-phenylene terephthalamide) filament, poly-1,4-phenylene terephthalamide-3,4'-diaminodiphenyl ether copolymer filament, poly (1,4-benzamide) filament, poly (1,3-phenylene isophthalamide) filament and the like. As the high-strength and high-modulus polyvinyl alcohol filament, mention may be made of polyvinyl alcohol filaments obtained by spinning from a spinning solution in an organic solvent such as dimethylsulfoxide (DMSO), ethylene glycol, glycerine or the like through semi-dry, semi-wet type spinning process and then drawing, which have a filament strength of not less than 15 g/d and is completely distinguished from the conventional vinylon filament. Particularly, when a part of the hydroxyl groups in the polyvinyl alcohol molecule of the filament is removed or subjected to a sealing treatment, the fatigue resistance is improved, so that such a treated filament is favorably used.

As the carbon filament used in the invention, mention may be made of carbonized filament obtained by firing polyacrylic fiber, carbonized filament made from petroleum pitch or coal tar pitch as a starting material, and the like. Particularly, the former filament is favorable to have an elongation at break of not less than 1.0%, preferably not less than 1.3%.

According to the invention, the above filament is required to have a tensile strength $T_Y$ of not less than 15 g/d. When the tensile strength is less than the above value, the resulting cord becomes excessively large or the number of belt layers used should be increased, so that the sufficient reduction of tire weight can not be attained. Furthermore, the filament is required to have a tensile modulus of not less than 250 g/d. When the tensile modulus is less than the above value, cords imparting sufficient belt rigidity can not be obtained.

As the resin used for impregnating into the bundle of the above filaments, use may be made of anyone of thermosetting resins and thermoplastic resins. The thermosetting resin includes epoxy resin, unsaturated polyester resin, phenolic resin, melamine resin, vinyl ester resin, polyimide resin, bismaleimide resin, furan resin, silicone resin, allyl resin and the like. The thermoplastic resin includes nylon-6,6, nylon-6, nylon-4,6, polyester, polyether ether ketone, polycarbonate, polyacetal and the like. Moreover, these resins may be used in an admixture of two or more thermosetting resins, or two or more thermoplastic resins, or thermosetting resin and thermoplastic resin.

When the cured product of the above resin is too rigid and becomes brittle, a resin modified with an elastomer such as liquid rubber or the like may be used to provide a strong toughness. Furthermore, in order to increase the strength per unit weight, the resin is favorable to have a specific gravity of not more than 1.5, preferably not more than 1.2.

The adhered amount of the resin is required to have a volume ratio $V_R$ of not less than 25% represented by the following formula: $V_R$=resin volume/(filament volume+resin volume)×100 in order to completely cover the filament bundle. Preferably, the resin volume ratio is not less than 35%. Moreover, when the resin volume ratio exceeds 70%, the volume in contrast with the strength undesirably becomes high. When the filament bundle is impregnated with the resin, it is preferable that not only the filament bundle but also each filament uniformly arranged in parallel therein are completely covered with the resin to sufficiently develop the strength of the resulting filament-resin composite body.

In the formation of the filament-resin composite body, it is necessary that the breaking load $S_F$ of the composite body to the breaking load $S_Y$ of the filament before the impregnation with the resin satisfies $S_F/S_Y \geq 1.0$ considering the kind of the resin and $V_R$. Preferably, $S_F/S_Y$ is not less than 1.1. When $S_F/S_Y$ is less than 1.0, the aligning of the filaments is insufficient, so that the strength of the filament-resin composite body enough to reduce the tire weight is not obtained. In this case, air bubbles and the like are included in the composite body or the filament distribution in the section of the composite body and the covered state thereof are ununiform and uncomplete, so that the resistance to bending fatigue is degraded.

As the method of producing the above filament-resin composite body, when using the thermosetting resin, the bundle of filaments continuously taken out is passed through a liquid of the thermosetting resin as a liquid bath, and the thus impregnated filament bundle is passed through a spinneret of circular section to substantially render into a given shape and remove excessive uncured resin liquid and bubbles entrapped in the bundle, and finally passed through a tubular mold having a circular section, at where the bundle is heated at 120°-170° C. to form a semi-cured filament-resin composite body. As shown in FIG. 1, the filament-resin composite body 1 has a section that the resin matrix 2 and the fibrous filaments 3 are uniformly dispersed into sea and island form. In this case, it is necessary to completely cover the surface of the composite body with the resin.

In case of using the thermoplastic resin, the composite body can be produced according to the same manner as in the case of using the thermosetting resin, in which a bath of fusing the resin through heating may be used as a liquid bath. If sufficient impregnation is not attained by this method, resin powder is previously sprinkled around the filaments to promote the impregnation, or the filaments are mixed with thermo-plastic resin fibers (e.g. nylon, polyester or the like) and then the later fibers are fused, whereby the composite body uniformly impregnated with the resin to the inside can be obtained.

The filament-resin composite body used in the invention has a diameter D of 0.2-0.55 mm, preferably 0.30-0.50 mm. When the diameter exceeds 0.55 mm, the resistance to buckling bending is poor. When it is less than 0.2 mm, the sufficient strength is not obtained and also the production cost becomes higher.

Then, the cord used in the invention is formed by twisting the above composite bodies into a layer construction of $1 \times n$ (n is an integer of 2-5) at a twisting pitch $l$ of 5-30 mm. When such cords are applied to the belt of the radial tire, the buckling of the belt cord due to local compression stress concentration produced the rapid turning of the tire is prevented by the twisting of the composite bodies. The reason why the cord has the layer construction is due to the fact that when the cord has a strand construction, the ratio of utilizing the strength based on the twisting is low and the cost at the twisting step increases. In the layer construction of $1 \times n$, the reason why n is limited to a range of 2-5 is due to the fact that when n is 1, no twisting is carried out. When n is not less than 6, the aligning of the composite bodies is poor in the twisting and the strength utilizing ratio becomes low. Preferably, n is within a range of 2-4.

Further, the reason why the twisting pitch $l$ is limited to a range of 5-30 mm is due to the fact that when $l$ exceeds 30 mm, the effect of reducing the local compression stress concentration is not sufficiently developed and the resistance to bending is degraded. When it is less than 5 mm, the strength utilizing ratio is undesirably lowered. In the twisting of the composite bodies into cord, there may be used the usual method for the formation of steel cord for tire from steel filaments. In this case, it is necessary to twist the composite bodies so as not to retain a large residual distortion in the filament after the twisting. If the distortion remains in the filament, the decrease of the strength becomes large through the twisting.

The twisted cord is required to have a compression modulus $CM_C$ of not less than 400 kg/mm², preferably not less than 800 kg/mm². If the compression modulus exceeds 2300 kg/mm², it becomes too high and is near to that of the steel cord, so that the buckling in the turning is too strong and the ground contacting property is degraded. The compression modulus $CM_C$ of not more than 1600 kg/mm² is preferable because the ground contacting property becomes better. When the compression modulus is less than 400 kg/mm², it is not sufficiently higher than that of the multifilament twisted cord. As a result the bending rigidity of the belt at the ground contacting area in the turning is not so high and satisfactory steering stability is not obtained.

Moreover, the end count N at a crown center portion of the belt layer is necessary to satisfy the following formula (1)

$$8600/(S_C \times E_C) < N < 41/(0.3n+1.3) \times D$$

with respect to the cord strength $S_C$, elongation at break $E_C$, twisting number n and composite body diameter D. In view of the safeness, N is preferably $10000/(S_C \times E_C) < N < 39/(0.3n+1.3) \times D$, more particularly $12000/(S_C \times E_C) < N < 35/(0.3n+1.3) \times D$. When N is less than $8600/(S_C \times E_C)$, it is apt to cause the breakage of belt cord at the groove bottom in the tread through stones and protrusions on road during the running on mountain roads, bad road and the like containing ground stones and so on. When N is more than $41/(0.3n+1.3) \times D$, the distance between the adjoining cords at the belt end is too narrow, so that strain of rubber interposed between the cords increases and the separation failure is apt to be caused in the running.

In the pneumatic radial tire according to the invention, it is necessary to use at least one belt layer containing the cords comprised of the composite bodies and embedded in rubber (hereinafter referred to as a composite body twisted cord belt layer simply) among plural belt layers as shown in FIGS. 2a to 2k.

Such a tire is illustrated in FIG. 7. In that FIG. numeral 10 is the radial tire. It has a bead portion 11, a sidewall portion 12 a tread portion 13, a carcass ply 14 and a belt 15. For example, the belt is comprised of a two composite body twisted cord belt layers 4-1, 4-2 as shown in FIGS. 2a-2c, or the belt may be a combination of the layer 4-1 or 4-2 with steel cord belt layer 5-1 or 5-2 as shown in FIGS. 2d-2g or a combination of the layer 4-1 or 4-2 with the conventional multifilament organic fiber twisted cord belt layer 6-1, 6-2 or 6-3 as shown in FIGS. 2h-2k. In the composite body twisted cord belt layer, both the ends may be free in plane (e.g. FIG. 2a) or may be folded as shown in the upper layer 4-2 of FIG. 2b. Among the above belt structures, the embodiments of FIGS. 2a, 2b, 2c, 2e, 2f, 2i and 2j are preferable. In addition, a circumferential cap ply layer containing nylon cords or the like may be disposed on the above belt structure. When the composite body twisted cord belt layer is used at a folded state, a thermosetting resin being at a semi-cured state in the filament before the vulcanization and being completely cured after the vulcanization may be used as a kind of the resin constituting the composite body.

Preferably, the above twisted cord is immersed in a usual aqueous solution of RFL (resorcin-formaline-latex) and then hot dried for adhesion to rubber. Moreover, rubber cement and the like may be used as an adhesive for rubber. The adhesive treatment may be carried out before and after the twisting of the filament-resin composite bodies. It usually carried out before the twisting in order to uniformly apply the adhesive. The composite body or the twisted cord may be subjected to a preliminary treatment with an aqueous solution of epoxy resin before the treatment with RFL adhesive in accordance with the kind of the resin used in the composite body, or the adhesion surface activity may be improved by subjecting a plasma treatment, a corona discharge treatment, an acid treatment or the like.

Moreover, a dry bonding system comprising resorcin, a formaldehyde forming agent such as hexamethylene tetramine or the like and silica may be compounded as an adhesive with rubber composition for coating the twisted cord. In this case, the adhesive treating step for the composite body or the cord can be omitted in accordance with the resin having good adhesion property.

The following examples are given in illustration of the invention and are not intended as limitations thereof.

The measurement of various properties in the filament-resin composite body and the twisted cord in Examples and Comparative Examples is as follows: (1) Tensile breaking load $T_Y$ (g/d), filament strength $S_Y$ (kg), tensile modulus $M_Y$ (g/d), breaking load of filament-resin composite body $S_F$ (kg), strength of composite body twisted cord $S_C$ (kg), elongation at break $E_C$ (%).

These values were measured by means of an autograph made by Shimazu Seisakusho according to strength and elongation measuring method of JIS L1017. Particularly, the tensile load of the filament $T_Y$ was obtained by dividing the strength at break (kg) by the denier (d), and the tensile modulus $M_Y$ was determined from a gradient of a tangential line in stress-strain curve at an elongation of 1%. (2) Compression modulus of cord ($CM_C$)

Figure 4:
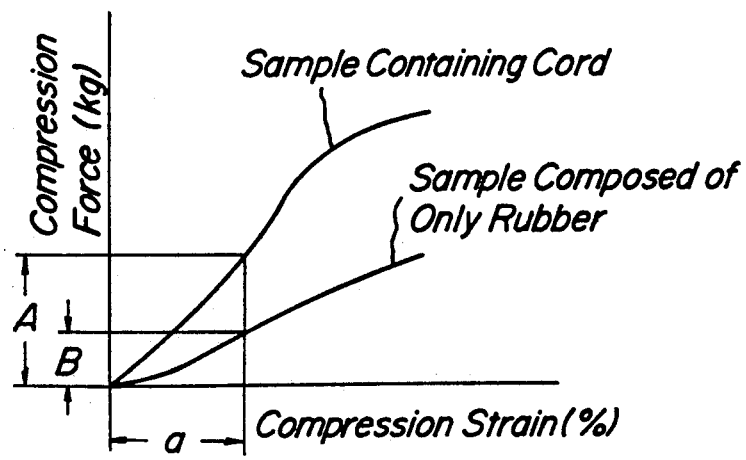
FIG. 4 is a graph showing a relation between compression force and compression strain based on measured results for the cord sample of FIG. 3.

There were provided two samples, a first sample of which being obtained by embedding five cords in a rubber cylinder of 30 mm in diameter and 50 mm in height at a distance between cords of 3 mm so as to arrange in parallel with each other in the longitudinal direction and the other sample being composed of only the rubber cylinder. Then, a compression force F was applied to each of the samples as shown in FIG. 3 to measure a compression strain. From this there was obtained a graph as shown in FIG. 4. Thereafter, the compression modulus ($CM_C$) of the cord was calculated according to the following equation:

$$CM_C(kg/mm^2) = (A-B) \times 100\%/a\% \times 1/A_0$$

(wherein a is an arbitrary compression strain (%), A and B are compression forces of the sample containing cords and the sample composed of only rubber, respectively, when a is 0.5%, and $A_0$ is an effective sectional area (mm$^2$) in total of five cords, i.e. sectional area occupied by the five cords through microscopic photograph at a section perpendicular to the cord direction).

Next, will be described production examples of the filament-resin composite body, twisted cord using the composite body and tire comprising a belt layer comprised of the twisted cords.

a) Production example of filament-resin composite body:

A bundle of non-twisted aramide filaments of 1500 d (Kevlar, trade name, made by DuPont) having a tensile strength $T_Y$ of 23.0 g/d and tensile modulus $M_Y$ of 570 g/d was impregnated with an epoxy resin as a thermosetting resin so as to have a volume ratio of resin to (filaments and resin) of 40% by weight, whereby a filament-resin composite body shown as No. 1 in Table 1 was obtained. The epoxy resin was used by adding liquid methylhexahydro phthalic acid anhydride as a curing agent and benzyl dimethylamine as a curing assistant to liquid bisphenol A-type epoxy resin. Similarly, there were produced various filament-resin composite bodies as shown in Table 1.

The filament-resin composite bodies No. 1–No. 8 in Table 1 satisfied conditions required on the composite body used in the tire according to the invention (mark O), while the composite bodies No. 9–No. 13 did not satisfy the conditions (mark X).

TABLE 1(a)

| Filament-resin composite body No. | 1 | 2 | 3 | 4 | 5 | 6 |
|---|---|---|---|---|---|---|
| Kind of filament | Kevlar | High-strength, high-modulus PVA filament | Kevlar 49[*1] | Kevlar 449[*1] | Carbon filament[*2] | Kevlar |
| denier (d) | 1500 | 1500 | 1140 | 1420 | 1800 | 720 |
| Tensile strength of filament $T_Y$ (g/d) | 23.0 | 16.2 | 22.3 | 18.0 | 17.5 | 23.1 |
| Tensile modulus of filament $M_Y$ (g/d) | 570 | 340 | 850 | 1110 | 2400 | 570 |
| Filament breaking load $S_Y$ (kg) | 34.6 | 24.4 | 25.4 | 25.2 | 31.4 | 16.4 |
| Kind of resin | epoxy | epoxy | nylon-6 | epoxy | epoxy | epoxy |
| Volume ratio of resin $V_R$ (%) | 40 | 40 | 45 | 50 | 37 | 40 |
| breaking load of filament-resin composite body $S_F$ (kg) | 40.8 | 28.3 | 30.0 | 30.0 | 37.8 | 20.0 |
| Diameter of filament-resin composite body D (mm) | 0.47 | 0.49 | 0.43 | 0.49 | 0.46 | 0.33 |
| $S_F/S_Y$ | 1.18 | 1.16 | 1.18 | 1.19 | 1.20 | 1.22 |
| Relation for filament-resin composite body defined in the invention | O | O | O | O | O | O |

[*1] Aramide fiber made by Du Pont
[*2] T-300 made by Toray

TABLE 1(b)

| Filament-resin composite body No. | 7 | 8 | 9 | 10 | 11 | 12 | 13 |
|---|---|---|---|---|---|---|---|
| Kind of filament | Kevlar 49 | Kevlar | Kevlar | Kevlar 49 | Kevlar | Kevlar | Kevlar |
| denier (d) | 380 | 1500 | 3000 | 195 | 3000 | 3000 | 1500 |
| Tensile strength of filament $T_Y$ (g/d) | 22.2 | 23.0 | 23.0 | 22.1 | 23.0 | 23.0 | 23.0 |
| Tensile modulus of filament $M_Y$ (g/d) | 850 | 570 | 570 | 850 | 570 | 570 | 570 |
| Filament breaking load $S_Y$ (kg) | 8.4 | 34.4 | 68.5 | 4.5 | 68.5 | 68.5 | 34.6 |
| Kind of resin | epoxy | nylon-6 | epoxy | epoxy | epoxy | epoxy | epoxy + liquid NBR |
| Volume ratio of resin $V_R$ (%) | 40 | 50 | 40 | 40 | 40 | 23 | 65 |
| breaking load of filament-resin composite body $S_F$ (kg) | 10.1 | 39.5 | 82.0 | 5.3 | 65.1 | 54.6 | 39.8 |
| Diameter of filament-resin composite body D (mm) | 0.24 | 0.51 | 0.67 | 0.17 | 0.69 | 0.65 | 0.59 |
| $S_F/S_Y$ | 1.20 | 1.15 | 1.20 | 1.18 | 0.95 | 0.89 | 1.15 |
| Relation for filament-resin composite body defined in the invention | O | O | X | X | X | X | X | b) Production example of twisted cord:
The above filament-resin composite body was immersed in an aqueous solution of resorcin-formalin-latex (RFL) adhesive and then subjected to a heat treatment at dry zone of 130° C.×120 seconds and subsequent hot zone of 225° C.×90 seconds. The thus treated composite bodies were twisted so as not to retain a large distortion in the composite body, whereby there were obtained various twisted cords as shown in Table 2. For the conventional multifilament twisted cord to be compared with the above twisted cord, aramide filaments of 1500 d (Kevlar, trade name, made by DuPont) were twisted at cable twist×ply twist=31×31 (turns/10 cm), immersed into the aqueous epoxy solution, subjected to a dry heat treatment at 160° C. for 120 seconds, immersed into RFL solution and then subjected to a dry heat treatment at 240° C. for 120 seconds to obtain a so-called dip cord (twisted cord No. 2). In Table 2, the twisted cords No. 3–No. 9 satisfied conditions required as a twisted cord used in the tire according to the invention (mark O), while the twisted cords No. 1, No. 2 and No. 10–No. 13 did not satisfy the conditions (mark X).

TABLE 2

| Twisted cord No. | 1 | 2 | 3 | 4 | 5 | 6 | 7 | 8 | 9 |
|---|---|---|---|---|---|---|---|---|---|
| Filament-resin composite body No. | Steel cord | Multifilament cord | 1 | 6 | 6 | 2 | 3 | 4 | 5 |
| Twisting structure (1 × n) | 1 × 5 *1 | 1500 d/2 | 1 × 2 | 1 × 3 | 1 × 5 | 1 × 2 | 1 × 3 | 1 × 4 | 1 × 4 |
| Twisting pitch l (mm) | 9 | 31 × 31 turns/10 cm | 16 | 23 | 16 | 25 | 12 | 15 | 10 |
| Cord breaking load $S_C$ (kg) | 64.2 | 49.8 | 74.2 | 57.2 | 90.0 | 52.6 | 79.2 | 106.8 | 94.4 |
| Elongation at break $E_C$ (%) | 2.9 | 5.4 | 4.4 | 4.3 | 4.2 | 5.1 | 3.3 | 2.8 | 2.6 |
| Compression modulus of cord $CM_C$ (kg/mm²) | 2773 | 50 | 1093 | 1113 | 1033 | 717 | 1593 | 2023 | 2307 |
| Retention of twisting strength $S_C/S_F × n$ | — | — | 0.91 | 0.95 | 0.90 | 0.93 | 0.88 | 0.89 | 0.83 |
| Relation of cord conditions defined in the invention | X | X | O | O | O | O | O | O | O |

| Twisted cord No. | 10 | 11 | 12 | 13 |
|---|---|---|---|---|
| Filament-resin composite body No. | 7 | 1 | 1 | 13 |
| Twisting structure (1 × n) | 1 × 6 | 1 × 2 | 1 × 2 | 1 × 2 |
| Twisting pitch l (mm) | 25 | 32 | 4.5 | 15 |
| Cord breaking load $S_C$ (kg) | 47.8 | 79.0 | 55.4 | 72.4 |
| Elongation at break $E_C$ (%) | 2.7 | 4.2 | 3.1 | 4.7 |
| Compression modulus of cord $CM_C$ (kg/mm²) | 1570 | 1167 | 703 | 277 |
| Rentention of twisting strength $S_C/S_F × n$ | 0.69 | 0.97 | 0.68 | 0.91 |
| Relation of cord conditions defined in the invention | X | X | X | X |

*1 filament diameter: 0.24 mm c) Production example of tire:
Each of various twisted cords, steel cord and conventional multifilament twisted cord as shown in Table 2 was used as a belt cord in two belt layers of a belt having the structure as shown in FIG. 2a, in which the cords of these layers were crossed with each other at a cord angle of 23° with respect to a circumferential direction of a tire. In this manner, there were various tires having a tire size of 205/60 R15. Moreover, two plies each containing polyester fiber cords of 1000d/2 were used as a carcass. The following properties were measured by the following methods with respect to the above prepared tires.

(i) Index of rolling resistance of tire R:
The test tire subjected to an internal pressure of 1.70 kg/cm² was placed on a drum of 1708 mm in outer diameter under loading corresponding to JIS 100% load, trained at 80 km/hr for 30 minutes, again adjusted to a given internal pressure, and then run at a drum rotating speed up to 200 km/hr. Thereafter, the driving of the drum was stopped to rotate the drum through inertia force, whereby the rolling resistance of the tire was calculated from an inertia moment of decreasing the drum rotating speed from 185 km/hr to 20 km/hr according to the following equation:

Rolling resistance of tire =

$$ds/dt(ID/RD^2 + It/RT^2) - \text{resistance of drum itself}$$

wherein
ID: inertia moment of drum
It: inertia moment of tire
RD: radius of drum
Rt: radius of tire.

Moreover, a typical value of the rolling resistance was determined at 60 km/hr according to the above equation. The measurement was carried out in a room controlled at 24°±2° C. The index of rolling resistance was represented by the following equation:

Index of rolling resistance in test tire =

$$100 + 100 \times (\text{typical value of control tire} - \text{typical value of test tire/typical value of control tire})$$

The smaller the value of the rolling resistance, the larger the index value and hence the better the fuel consumption performance. Moreover, the tire of Conventional Example 1 was used as a control tire.

(ii) Index of steering stability H:

The test tire was mounted onto a vehicle and run at a speed of 60-200 km/hr, during which the steering stability was evaluated by feeling of a test driver. The steering stability was represented by an index on the basis that the control tire was 10 point. The larger the index value, the better the steering stability.

(iii) Number of bent cords after eight-shaped turning test:

As eight-shaped turning test, the tire was run on an eight figure curve by means of an automatic driving device. After 500 laps of the test, a pair of front wheeled tires were cut to measure the number of bent cords B1 in the belt layer over the entire circumference, from which the total number of bent cords in the first and second belt layers of the front wheeled tires was determined.

(iv) Number of broken cords after the running on bad road:

The test tire subjected to an internal pressure of 2.5 kg/cm² was run on a course consisting of 40% bad road and 60% good road under a load of 495 kg till the tread rubber was completely worn. Thereafter, the belt layer was exposed from the tire to measure the number of broken cords in the tire, whereby the resistance to cord breakage on a bad road was evaluated.

(v) Drum test for durability:

The test tire was run on a drum at a speed of 60 km/hr under an internal pressure of 3.0 kg/cm² and a load of 990 kg. The running was stopped over a distance of 20000 km in case of causing no trouble.

(vi) End count N of belt cords in crown center portion

The belt in the test tire was cut in a direction perpendicular to the cord arranging direction and then a scale was applied to the cut surface to measure the number of cords existing within a width range of 5 cm at a crown center of the tire. Moreover, the measurement was carried out at three positions in the circumferential direction of the tire. The end count N (cords/5 cm) was determined from an average of 6 measured values of the first and second bent layers.

The test results are shown in Table 3.

TABLE 3-1

|  | Conventional Example 1 | Conventional Example 2 | Comparative Example 1 | Comparative Example 2 | Comparative Example 3 | Example 1 | Example 2 |
|---|---|---|---|---|---|---|---|
| Twisted cord No. | 1 | 2 | *1 | *2 | *3 | 3 | 5 |
| Index of rolling resistance in tire R | 100 | 104 | 105 | — | — | 105 | 104 |
| Index of steering stability H | 10 | 7 | 12 | — | — | 12 | 12 |
| Number of broken belt cords after eight-shaped turning B | 0 | 0 | 46 | 149 | 63 | 0 | 0 |
| Number of broken belt cords after the running on bad road C | 0 | 0 | — |  |  | 0 | 0 |
| Result of drum test on durability | 20000 km complete run | 20000 km complete run |  |  |  | 20000 km complete run | 20000 km complete run |
| End count N (cords/5 cm) | 33.9 | 40.1 |  |  |  | 41.0 | 41.2 |
| Sc (kg) | — | — | — |  |  | 74.2 | 90.0 |
| Ec (%) | — | — | — |  |  | 4.4 | 4.2 |
| 8600/(Sc × Ec) | — | — | — |  |  | 26.3 | 22.8 |
| D | — | — | — |  |  | 0.47 | 0.33 |
| n | — | — | — |  |  | 2 | 5 |
| (0.2n + 1.3) × D | — | — | — |  |  | 0.893 | 0.924 |
| 41/[(0.3n + 1.3) × D] | — | — | — |  |  | 45.9 | 44.4 |

|  | Example 3 | Example 4 | Example 5 | Comparative Example 5 |
|---|---|---|---|---|
| Twisted cord No. | 6 | 7 | 9 | 11 |
| Index of rolling resistance in tire R | 105 | 106 | 105 | 104 |
| Index of steering stability H | 11 | 12 | 11 | 11 |
| Number of broken | 0 | 0 | 0 | 14 |

TABLE 3-1-continued

|  |  |  |  |
|---|---|---|---|
| belt cords after eight-shaped turning B |  |  |  |
| Number of broken belt cords after the running on bad road C | 0 | 0 | 0 |
| Result of drum test on durability | 20000 km complete run | 20000 km complete run | 20000 km complete run |
| End count N (cords/5 cm) | 34.2 | 34.5 | 38.0 |
| Sc (kg) | 52.6 | 79.2 | 94.4 |
| Ec (%) | 5.1 | 3.3 | 2.6 |
| 8600/(Sc × Ec) | 32.1 | 32.9 | 35.0 |
| D | 0.49 | 0.43 | 0.46 |
| n | 2 | 3 | 3 |
| (0.2n + 1.3) × D | 0.931 | 0.946 | 1.012 |
| 41/[(0.3n + 1.3) × D] | 44.0 | 43.3 | 40.5 |

TABLE 3-2

|  | Comparative Example 5 | Comparative Example 6 | Comparative Example 7 | Comparative Example 8 | Comparative Example 9 | Comparative Example 10 |
|---|---|---|---|---|---|---|
| Twisted cord No. | 13 | 5 | 6 | 7 | 9 | 9 |
| Index of rolling resistance in tire R | 104 |  |  |  |  |  |
| Index of steering stability H | 8 |  |  |  |  |  |
| Number of broken belt cords after eight-shaped turning B | — |  |  |  |  |  |
| Number of broken belt cords after the running on bad road C |  | 0 | 12 | 18 | 0 | 29 |
| Result of drum test on durability | 15000 km *4 | 20000 km complete run | 20000 km complete run | 12000 km *4 | 20000 km complete run |  |
| End count N (cords/5 cm) | 46.0 | 31.1 | 31.5 | 41.0 | 34.4 |  |
| Sc (kg) | 90.0 | 52.6 | 79.2 | 94.4 | 94.4 |  |
| Ec (%) | 4.2 | 5.1 | 3.3 | 2.6 | 2.6 |  |
| 8600/(Sc × Ec) | 22.8 | 32.1 | 32.9 | 35.0 | 35.0 |  |
| D | 0.33 | 0.49 | 0.43 | 0.46 | 0.46 |  |
| n | 5 | 2 | 3 | 3 | 3 |  |
| (0.2n + 1.3) × D | 0.924 | 0.931 | 0.946 | 1.012 | 1.012 |  |
| 41/[(0.3n + 1.3) × D] | 44.4 | 44.0 | 43.3 | 40.5 | 40.5 |  |

|  | Comparative Example 11 | Comparative Example 12 | Comparative Example 13 | Comparative Example 14 |
|---|---|---|---|---|
| Twisted cord No. | 4 | 4 | 8 | 8 |
| Index of rolling resistance in tire R |  |  |  |  |
| Index of steering stability H |  |  |  |  |
| Number of broken belt cords after eight-shaped turning B |  |  |  |  |
| Number of broken belt cords after the running on bad road C | 11 | 0 | 23 | 0 |
| Result of drum test on durability | 20000 km complete run | 17000 km *4 | 20000 km complete run | 16000 km *4 |
| End count N (cords/5 cm) | 34.4 | 57.1 | 28.0 | 34.6 |
| Sc (kg) | 57.2 | 57.2 | 106.8 | 106.8 |
| Ec (%) | 4.3 | 4.3 | 2.8 | 2.8 |
| 8600/(Sc × Ec) | 35.0 | 35.0 | 28.8 | 28.8 |
| D | 0.33 | 0.33 | 0.49 | 0.49 |
| n | 3 | 3 | 4 | 4 |
| (0.2n + 1.3) × D | 0.726 | 0.726 | 1.225 | 1.225 |
| 41/[(0.3n + 1.3) × D] | 56.5 | 56.5 | 33.5 | 33.5 |

*1 Cord used in Comparative Example 1 is a cord of fiber-resin composite fiber material No. 9 without twisting.
*2 Cord used in Comparative Example 2 is a cord of fiber-resin composite fiber material No. 11 without twisting.
*3 Cord used in Comparative Example 3 is a cord of fiber-resin composite fiber material No. 12 without twisting.
*4 separation failure at belt end.

As seen from Table 3, when the usual steel cord used in the tire of Conventional Example 1 is replaced with the multifilament twisted cord shown in Conventional Example 2, the tire weight becomes light and the rolling resistance R of the tire is 104. In this case, the tire dimensions and tread radius and the like are substantially equal between both the tires so as not to affect the shape or the like of the tire. However, the index H of steering stability in Conventional Example 2 is 7, which is poorer than that of Conventional Example 1. On the other hand, when the filament-resin composite body No. 9 is used without twisting as described in Comparative Example 1, R and H can simultaneously be improved, but the number of bent cords B in the rapid turning becomes larger, which comes into problem in the durability. Particularly, when the composite bodies No. 11 and No. 12 not satisfying the condition $S_F/S_Y$ defined in the invention are used as described in Comparative Examples 2 and 3, the B value further becomes large, which comes into serious problem in the durability. In Comparative Example 4, since there is used the twisted cord No. 11 obtained by twisting the composite bodies at a twisting pitch l of 32 mm, the effect of improving the resistance to belt bending is small and the B value is still 14, so that there is a problem in the durability.

Figure 5:
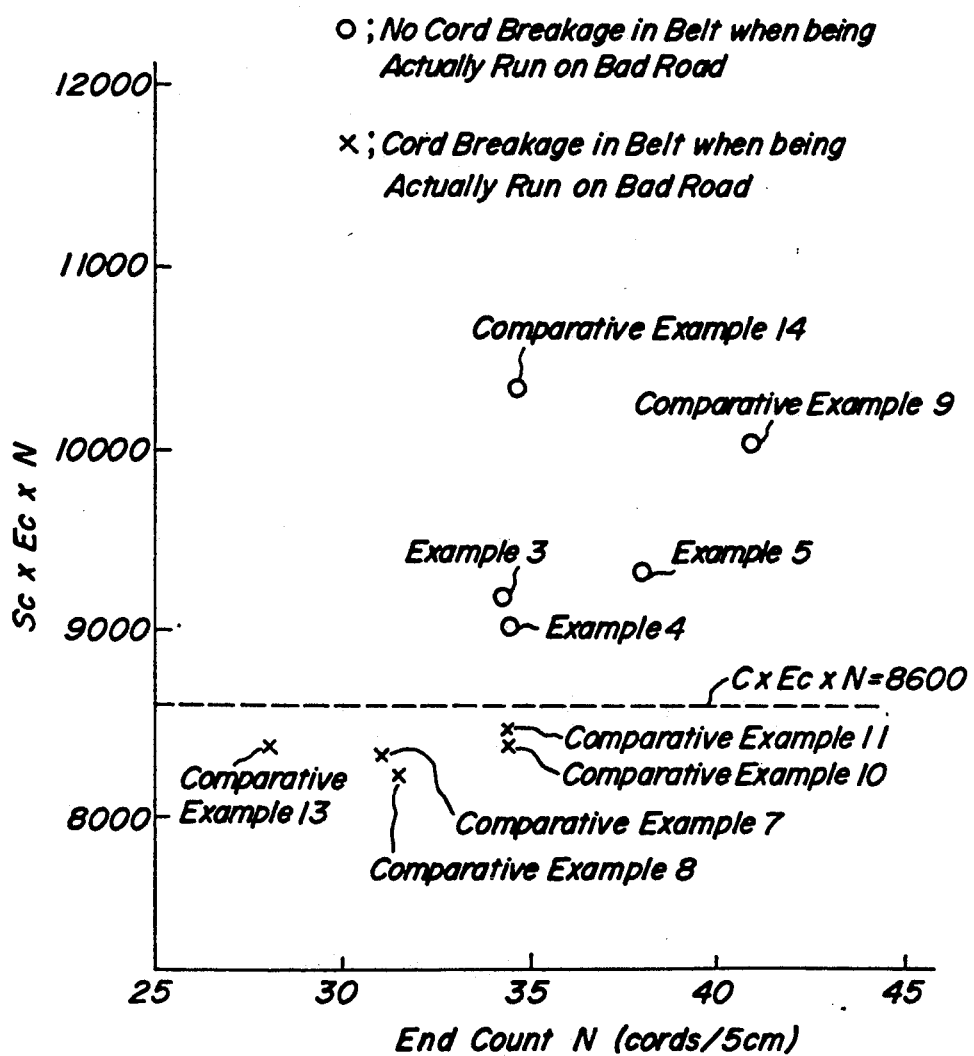
FIG. 5 is a graph showing a relation between end count N and $S_C \times E_C \times N$ on the cord breakage in the belt of the pneumatic radial tire by actual test running on bad road.

On the contrary, R, H and B are excellent in Examples 1-5. In the twisted cord No. 12, l is as small as 4.5 mm and the twisting becomes large, so that the retention of twisting strength is undesirably low, while in the twisted cord No. 10, the twisting number is 6, so that the retention of twisting strength becomes undesirably low. In the composite body No. 10, the diameter D is as small as 0.17 mm and the strength $S_F$ is only 5.3 kg, so that it is difficult to put into practical use even when the composite bodies are twisted. In the tire of Comparative Example 5, since the cord No. 13 having insufficient compression modulus $CM_C$ is used, the steering stability H is poor. In Comparative Examples 7, 8, 10, 11 and 13, the end count N in these tires does not satisfy the relation to $S_C$, $E_C$ defined in the invention, so that the breakage of belt cord occurs in the running on bad road and the reliability of durability is lacking, which is clearly shown in FIG. 5. On the other hand, in Comparative Examples 6, 9, 12 and 14, N in these tires does not satisfy the relation to D, n defined in the invention, so that the separation failure at belt end is caused in the course of drum test, which also comes into problem in the durability as clearly shown in FIG. 6.

As mentioned above, in the pneumatic radial tire according to the invention, particular twisted cords obtained by twisting particular filament-resin composite bodies are arranged at a particular end count in at least one belt layer among plural belt layers constituting the belt of the tire, so that the weight is light, the rolling resistance and steering stability are excellent and also the resistances to bending of belt cord in the rapid turning and breaking of belt cord in the running on bad road are improved.

What is claimed is:

1. A pneumatic radial tire comprising a pair of bead portions, a pair of side wall portions each extending from the respective bead portion, a tread portion extending between the sidewall portions, a carcass extending between the bead portions and comprised of at least one carcass ply containing cords arranged at a cord angle of 75°-90° with respect to a circumferential direction of the tire, and a belt arranged on the carcass in the tread portion and comprised of plural belt layers each containing cords arranged at a cord angle of 10°-35° with respect to the circumferential direction of the tire, cords of which layers being crossed with each other, characterized in that at least one belt layer among the above belt layers is a rubberized layer of cords obtained by completely impregnating a substantially non-twisted bundle of filaments selected from aromatic polyamide filament, high-strength, and high modulus polyvinyl alcohol filament and carbon filament having a tensile strength ($T_Y$) of not less than 15 g/d and a tensile modulus ($M_Y$) of not less than 250 g/d with a resin to form a filament-resin composite body of substantially circular section having a diameter (D) of 0.2-0.55 mm and then twisting a plurality of the filament-resin composite bodies into a layer construction of 1×n (wherein n is an integer of 2-5) at a twisting pitch (l) of 5-30 mm, in which a breaking load ($S_F$) of the filament-resin composite body to a breaking load ($S_Y$) of the filament before the impregnation with the resin satisfies $S_F/S_Y \geq 1.0$, and an end count (N, cords/5 cm) of the rubberized layer located at its crown center portion satisfies a relation represented by the following formula:

$$8600/(S_C \times E_C) < N < 41/[(0.3n+1.3) \times D]$$

(wherein $S_C$ is a breaking load (kg) of the cord after the twisting, $E_C$ is an elongation at break (%), and n and D are the same as mentioned above).

2. The pneumatic radial tire according to claim 1, wherein said composite body has a resin volume ratio of not less than 25%.

3. The pneumatic radial tire according to claim 2, wherein said resin volume ratio is within a range of 35-70%.

4. The pneumatic radial tire according to claim 1, wherein said ratio $S_F/S_Y$ is not less than 1.1.

5. The pneumatic radial tire according to claim 1, wherein said diameter D is 0.30-0.50 mm.

6. The pneumatic radial tire according to claim 1, wherein said n is 2-4.

7. The pneumatic radial tire according to claim 1, wherein said twisting pitch l is 10-25 mm.

8. The pneumatic radial tire according to claim 1, wherein said twisted cord has a compression modulus of not less than 1000 kg/mm².

9. The pneumatic radial tire according to claim 8, wherein said compression modulus is 2500-5000 kg/mm².

10. The pneumatic radial tire according to claim 1, wherein said end count N is $$10000/(S_C \times E_C) < N < 39/(0.3n+1.3) \times D.$$

11. The pneumatic radial tire according to claim 10, wherein said end count N is $$12000/(S_C \times E_C) < N < 35/(0.3n+1.3) \times D.$$

* * * * *